United States Patent [19]

Lindemann et al.

[11] 4,320,459

[45] Mar. 16, 1982

[54] PROCESS AND APPARATUS FOR CONTROLLING THE BRAKING PRESSURE IN ANTI-SKID MOTOR VEHICLE BRAKE SYSTEMS

[75] Inventors: Klaus Lindemann, Hanover; Konrad Rode, Seelze; Erwin Petersen, Wunstorf, all of Fed. Rep. of Germany

[73] Assignee: WABCO Fahrzeugbremsen GmbH, Hanover, Fed. Rep. of Germany

[21] Appl. No.: 56,680

[22] Filed: Jul. 11, 1979

[30] Foreign Application Priority Data

Jul. 12, 1978 [DE] Fed. Rep. of Germany ....... 2830580

[51] Int. Cl.³ .............................................. B60T 8/02
[52] U.S. Cl. .................................... 364/426; 303/96; 303/105; 303/111
[58] Field of Search .................... 364/426; 303/93, 95, 303/96, 103, 105, 111

[56] References Cited

U.S. PATENT DOCUMENTS

| | | | |
|---|---|---|---|
| 3,754,797 | 8/1973 | Rodi et al. | 303/96 |
| 3,820,857 | 6/1974 | Schnaibel et al. | 303/105 |
| 3,866,981 | 2/1975 | Klatt | 303/111 X |
| 3,887,240 | 6/1975 | Leiber et al. | 303/111 |
| 3,918,766 | 11/1975 | Klatt | 303/111 |
| 3,926,477 | 12/1975 | Klatt | 303/111 |
| 4,005,910 | 2/1977 | Leiber et al. | 303/96 |
| 4,054,328 | 10/1977 | Leiber et al. | 303/103 |
| 4,059,312 | 11/1977 | Jonner | 303/96 X |
| 4,077,675 | 3/1978 | Leiber et al. | 303/95 |

Primary Examiner—Jerry Smith
Attorney, Agent, or Firm—A. G. Williamson, Jr.

[57] ABSTRACT

Sensor devices detect the dynamic response of each vehicle wheel to braking pressure and produce control signals if the associated wheel rapidly decelerates, slips, or accelerates. When braking pressure is initially applied, a deceleration control signal output from the sensor associated with a low friction wheel actuates, through a co-control logic circuit network, exhaust of braking pressure on both wheels on the corresponding axle. Shortly a period of fast application of braking pressure on both wheels occurs for a preselected time interval. This application is extended, for the co-controlled wheel only, for a shorter time period established by a timer through the logic network. After a holding period for both wheels, but at different pressure levels, a brief increase in braking pressure is actuated until another deceleration signal is output by the controlled wheel sensor. This actuates an exhaust of pressure in both wheels. However, the co-controlled wheel exhaust is normally of shorter duration since a subsequent slip control signal from the controlled wheel acts only to continue to exhaust that wheel's pressure. The periods of timed application, hold, and exhaust repeat as vehicle speed is reduced.

4 Claims, 4 Drawing Figures

PROCESS AND APPARATUS FOR CONTROLLING THE BRAKING PRESSURE IN ANTI-SKID MOTOR VEHICLE BRAKE SYSTEMS

The invention concerns a process for controlling the braking pressure in anti-skid motor vehicle brake systems and apparatus for performing this process.

The so-called "select-low" anti-skid control system is well known. In this system, the braking pressure is controlled according to the wheel with the poorest frictional resistance (greatest slip, lowest wheel speed). Although no yawing movements occur in a pure "select-low" control system, the stopping distance is unacceptably long. The "select-high" control system is also well known. In this system the braking pressure is controlled according to the wheel with the greatest frictional resistance (least slip, highest wheel speed). The disadvantage of this system is the poor driving stability during braking as a result of the large yawing movements. Other systems are also known in which it is possible to convert from select-low to select-high control and vice versa, depending on various criteria. For example, the West German Preliminary Published patent application DE-OS No. 21 19 590, filed Apr. 22, 1971, published Nov. 2, 1972, describes a process in which one axle is controlled essentially by a select-high control system, and in which a change to select-low control is made on the basis of transverse accelerations occurring during braking or on the basis of the steering angle or the slip or when both wheels show locking tendency over a predetermined length of time.

U.S. Pat. No. 4,005,910, issued Feb. 1, 1977, describes an antilocking or anti-skid control system in which provision is made for switching back and forth between select-low and select-high control on the basis of the pressure buildup times in the select-low and select-high control systems. For a given predetermined ratio of the two pressure buildup times, the select-high control is maintained for a predetermined time but at the end of this time, control is switched to select-low. In addition, provision is made for switching devices that switch from select-high back to select-low when the co-controlled wheel also shows locking tendency before the predetermined time for the select-high operation has ended. German published application DE-OS No. 22 43 260, filed Sept. 2, 1972, and published Mar. 7, 1974, describes a process in which a select-low control system is normally in operation, and in which provision is made for switching to select-high control upon the occurrence of a control signal for a predetermined time, whereby this switching can also be delayed. A process described in the German published application DE-OS No. 26 10 585, filed Mar. 13, 1976, and published Sept. 15, 1977, provides for switching between the two types of control on the basis of the axle load or the control pressure. The axle with the greatest axle load is determined by measuring the axle load or the control pressure. This axle is then controlled by select-high control, and the other axle is controlled by select-low control. By comparing the maximum wheel speed with the average of the wheel speeds, it can be determined which of the axles is controlled by select-high control.

Although certain improvements in braking and riding behavior are realized with these processes, the yawing movements are still unacceptably high, at least when the system is switched to select-high control, and relatively large steering corrections are still required of driver. In U.S. Pat. No. 3,918,766, issued Nov. 11, 1975, a process is described for reducing the yawing movement and the required steering work, in which the wheel running at the higher coefficient of friction is co-controlled by the controlled wheel in such a way that the braking pressure is maintained when the braking pressure is reduced on the controlled wheel, and that the braking pressure for the co-controlled wheel is co-controlled by the control channel of the controlled wheel in the application phase of the controlled wheel, at least in the first control cycle after the first fast application phase and the first pressure maintenance phase. However, it has been found that in this process as well unacceptably high yawing movements occur at split friction values, and the driver still has to perform considerable steering work to keep the vehicle in the direction of travel, because the differential pressure is still too high and is built up too quickly.

The object of the present invention, therefore, is to provide a process and apparatus to perform the process, to significantly improve the roadway driving stability and the braking effort of vehicles, especially those having wheels with different friction values.

With the arrangement of the invention, the differential pressure, and thus the yawing movement, is built up slowly and essentially in-phase, so that even at extreme different friction values for the opposite wheels on an axle, the driving stability and controllability of the vehicle are significantly improved compared to the known processes for reducing the yawing movements. The braking power is utilized better than with select-low control systems, so that shorter stopping distances are realized.

The invention will now be explained in greater detail on the basis of the drawings, which show specific embodiments of the invention.

FIG. 1 includes charts showing vehicle velocity behavior, braking pressure behavior, control signals, and drive signals for the solenoid valves of the brake systems of two opposite wheels on one axle, one of which is the controlling wheel, while the other is the co-controlled wheel.

Figure 1:
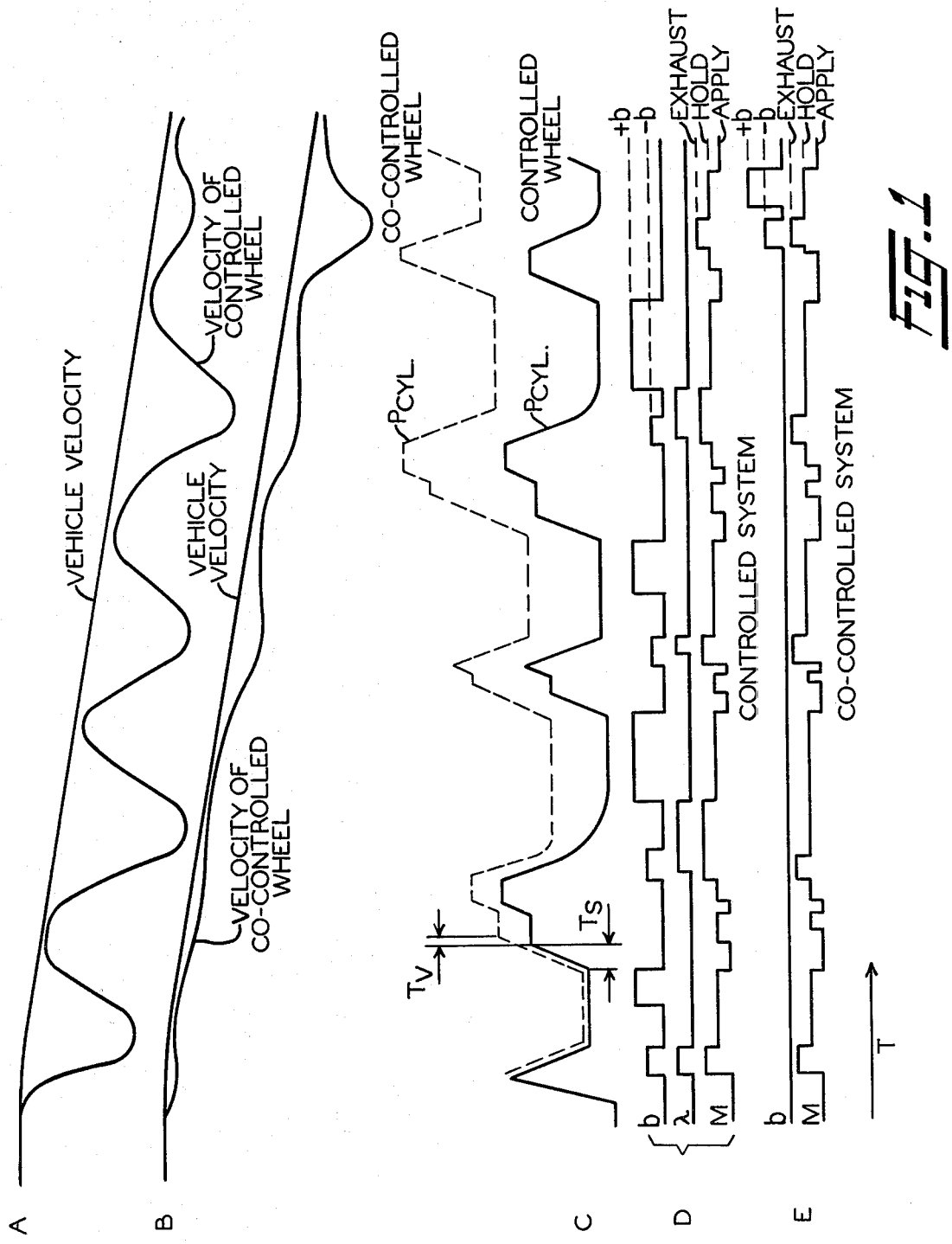

The charts of FIG. 1 provide a picture of the operation of a braking pressure control system corresponding essentially to the select-low control concept but embodying special features of the present invention. Referring to FIG. 1, charts A and B are diagrams representing the relationship between vehicle velocity and the relative velocity of the wheels on the opposite ends of the same axle of a vehicle having an anti-skid control system embodying the features of this present invention. In each of the charts or diagrams, time runs from left to right as illustrated by the arrow T at the bottom of this figure. The upper curve in chart A indicates a decreasing velocity of the vehicle after brakes are applied. The lower cyclic curve represents the changing velocity of the controlled wheel, i.e., the wheel that has the lower friction characteristic or value. The extremely cyclic nature of this curve represents the quick deceleration of the wheel, i.e., lock-up, skid, or slide, as the brake is applied and the restoration of roll as a corrective brake release occurs. The upper curve of chart B is the same vehicle velocity curve duplicated for easier comparison with the velocity curve of the other or co-controlled wheel which has a higher friction characteristic. Even here the change in wheel velocity varies some as braking pressure is applied and partially released during vehicle deceleration. Chart C includes two curves showing pressure in the brake cylinders ($P_{cyl}$) of the controlled (solid line) and co-controlled (dash line) wheels. The selected application and delay times TS and TV illustrated and the charge (application) and discharge (exhaust) of cylinder pressures will be discussed later. The diagrams in chart D illustrate the periods of occurrence, for the controlled wheel system, of deceleration/acceleration control signals b, slip control signals λ, and brake valve solenoid drive signals M. The significance of the different levels of each pulse chart is designated at the right of the drawing. Similar diagrams in chart E represent signals b and M for the co-controlled wheel.

The illustrations of the various actions in charts C, D, and E are synchronized as time moves left to right. The wheel velocity curves of charts A and B are also time related to these actions. These charts start at the left with brake cylinder pressure $P_{cyl}$ at zero or at least a minimum, at-rest level. The initial rise in $P_{cyl}$ in chart C represents a braking action on both wheels, with both M signals in apply condition. Vehicle velocity begins to decrease but one wheel, chart A, experiences a rapid deceleration, i.e., slip or skid. The associated control system produces −b and λ signals which causes a reduction in $P_{cyl}$, for both wheels, to an intermediate holding level, as directed by the condition of the M signals. As the velocity of the controlled wheel rises toward vehicle velocity (chart A), the continued brake request actuates a +b signal from the associated system. This actuates a renewal of brake pressure application ($P_{cyl}$) in both wheels under a fast pressure application condition for a time period $T_S$ (chart C). For the controlled wheel, signal M is shifted to a hold condition at the end of period $T_S$. The other wheel is co-controlled until the end of period $T_S$. The fast application period is then independently continued for this other wheel for a second predetermined time period $T_V$, which, for example, may be 20 msec. This builds pressure $P_{cyl}$ for the other wheel to a higher level (chart C) which is subsequently maintained. At the end of time $T_V$, co-control by the controlled wheel system is reinstituted so that the corresponding $P_{cyl}$ pressure (dashed line) then holds for the remainder of a holding period. A slight further increase in both $P_{cyl}$ then occurs. The rapid deceleration and/or slip-skid condition of the controlled wheel now becomes evident (chart A) so that a −b deceleration control signal is produced which causes both M signals to shift to exhaust condition. The co-controlled wheel $P_{cyl}$ exhaust is responsive only to the −b signal and not the λ slip control signal of the controlled system. Thus, the co-controlled M signal shifts to the hold condition and remains there until pressure is again applied. Meanwhile the controlled wheel $P_{cyl}$ continues to exhaust during the λ signal phase and then holds during the +b acceleration control signal as the wheel recovers from its skid condition. Reference to chart C illustrates this action and the increased difference in the two $P_{cyl}$ levels.

Similar cycles of fast pressure application, with time periods $T_S$ and $T_V$, followed by reduction of braking pressure in both wheels, repeat at intervals during reduction of vehicle velocity by braking. The $P_{cyl}$ level of the co-controlled wheel periodically increases to higher levels above that for the controlled wheel. Each cycle is initiated when the velocity of the controlled wheel restores to vehicle velocity level while the pressure reduction phase is actuated by the detection of rapid deceleration and/or a skid condition of that wheel.

Figure 2:
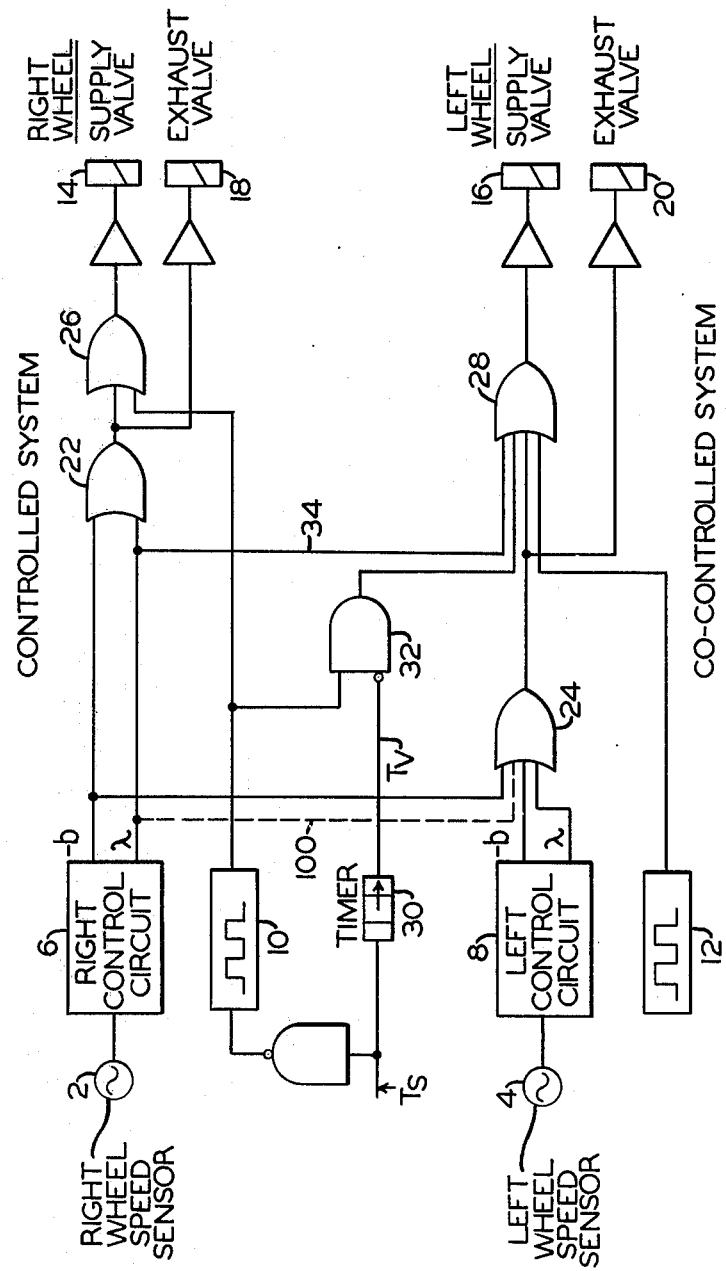
FIG. 2 shows a circuit arrangement for achieving the operation shown in FIG. 1.

FIG. 2 shows a circuit arrangement for the right and left wheels of one axle for achieving the conditions and actions shown in FIG. 1.

For each brake system of the wheels the diagram shows schematically a speed sensor (2 and 4), a principal control circuit (6 and 8), a pulse generator (10 and 12), supply valve solenoids (14 and 16) and exhaust valve solenoids (18 and 20), and buffer amplifiers (with no reference numbers) connected to supply sufficient operating energy to the solenoids. It is to be noted that, in FIGS. 3 and 4, the supply and exhaust valve solenoids are designated simply SV and EV, respectively. The −b and λ control signals are combined in an OR gate (22 and 24), and the output signals of these OR gates and the output signals of the pulse generators (10 and 12) are combined in an OR gate (26 and 28). These are followed in the circuit arrangement by the supply valves (14 and 16). The output signals of OR gates 22 and 24 also control exhaust valves 18 and 20, respectively. As is usual in such control systems, the supply valve solenoids are normally energized to inhibit the application of braking pressure. In other words, pressure is applied into the brake cylinder when the corresponding solenoid is deenergized. Conversely, however, the exhaust valve solenoids must be energized to exhaust pressure from the brake cylinders.

For the sake of simplicity, FIG. 2 shows only the select-low connection in one direction, namely, from principal control circuit 6 for the right wheel, which is to be regarded as the controlled wheel, to the control circuit for the left wheel, which is not controlled. The logical connection is accomplished via OR gate 24, in which the −b and λ control signals of the co-controlled system and, ignoring dash line 100, the −b control signals of the controlling system are combined.

For the fast pressure application phase, a time $T_S$ is set after the end of the initial pressure holding phase, at the end of which time the pulse generator 10 for the controlled system and a timing circuit 30 with disconnection delay are started. The output signals of the pulse generator 10 are combined with the inverted output signals of the timing circuit 30 in an AND gate 32, whose output is combined with the outputs of OR gate 24 and pulse generator 12 of the co-controlled circuit in OR gate 28. Thus, until termination of the operation of timing circuit 30 there is no control of the supply and exhaust valves of the co-controlled system. For the duration of the disconnection delay $T_v$ of timing circuit 30, e.g. 20 msec, there is a prolongation of the fast application time in the pressure application phase. When the timing period of circuit 30 is completed, e.g., after the 20-msec period specified above, AND gate 32 switches the pulse generator 10 to the supply valve 16 of the co-controlled system via OR gate 28. From this point on the pressure regulation of the co-controlled system occurs synchronously with the pressure regulation of the controlled system until discharge of the next −b control signal of the controlled system.

After output of the next −b control signal by the controlled system ends, the pressure holding phase starts immediately in the co-controlled system. The pressure holding phase of the co-controlled system ends with the pressure holding phase of the controlled system, as shown by the diagrams for the solenoid control signals M in FIG. 1. In order to achieve this control behavior in the circuit arrangement shown in FIG. 2, the λ control signal of the controlled system is sent via line 34 to OR gate 28 to control the supply valve (16) of the co-controlled system.

Figure 3:
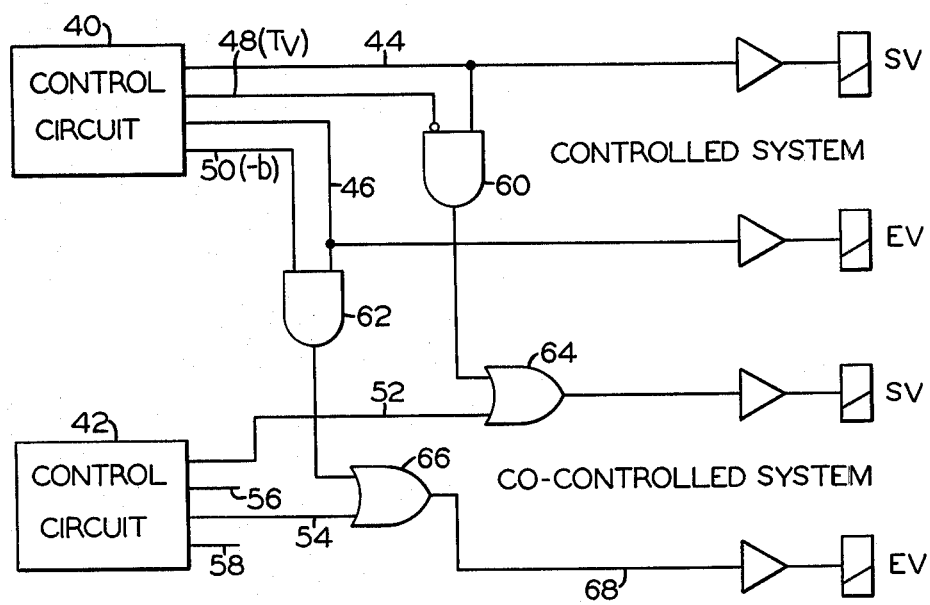
FIG. 3 and FIG. 4 show additional modified circuit arrangements.

Let us now consider the circuit arrangement shown in FIG. 3. In this circuit network, the combination of the control signals occurs largely inside the principal circuits 40, 42 of the two control channels for the two wheels on one axle. In order to permit control in accordance with the present invention, the principal circuits 40 and 42 each have four connections (44, 46, 48, 50 and 52, 54, 56, 58, respectively). These lines, in order in each set, are for the control signal of the supply valve SV, the control signal of the exhaust valve EV, the time signal $T_\nu$ for the extended fast application time of the pressure application phase, and the −b control signal, respectively. Here again, for the sake of simplicity, only the connection from the controlled system to the other, co-controlled system is shown. The corresponding reverse connection would be constructed symmetrically to the system shown in the diagram. Connections 44 and 48 for the control signal of the supply valve SV and for the time signal $T_\nu$ are combined in an AND gate 60, with the input of the AND gate for the time signal $T_\nu$ inverted. Connections 46 and 50, i.e., the control signal of the exhaust valve EV and the −b control signal, are combined in an AND gate 62. The output signal of the AND gate 60 is combined with the control signal for the supply valve of the co-controlled system in an OR gate 64, whose output is passed through a buffer amplifier to the supply valve SV of the co-controlled system. The output signal of AND gate 62 and the control signal 54 for the exhaust valve of the co-controlled system are combined in an OR gate 66, whose output is connected through a buffer amplifier to exhaust valve EV of the co-controlled system.

It is immediately apparent that as long as the signal $T_\nu$ characterizing the additional application time is present on line 48, the supply valve of the co-controlled system is not co-controlled by the controlled system due to the inverted input of AND gate 60. The uncontrolled system is not co-controlled again via AND gate 60 until after loss of the signal on line 48.

Figure 4:
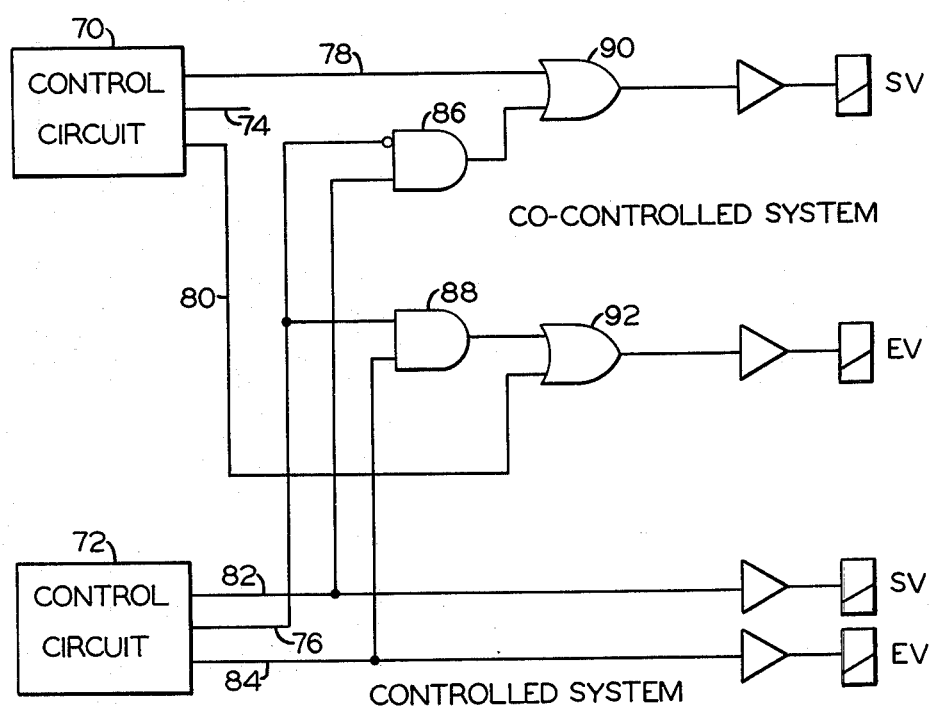

FIG. 4 shows another circuit arrangement, in which provision is made for extensive combination of the various signals inside the principal control circuits 70 and 72, so that only one output line (74 and 76, respectively) is needed in addition to the control lines (78 and 80, and 82 and 84, respectively) for the supply (SV) and exhaust (EV) valves. In FIG. 4 it has again been assumed that one of the systems is the controlled system (here 72), while the other system is the co-controlled system (here 70). For the sake of simplicity, only the logical connection in one direction is shown, the other connection would be constructed symmetrically to it.

Both the time signal for the additional pressure increase and the −b control signal for the joint pressure reduction appear on lines 74 and 76. In order to achieve the control behavior shown in FIG. 1, there is an AND gate 86, which combines the signal line 76 via a inverted input with the supply valve control line 82, and an AND gate 88, which combines line 76 with the exhaust valve control line 84. The output signal of AND gate 86 is combined with the supply valve control signal of the co-controlled system in an OR gate 90 for controlling the supply valve SV of the co-controlled system. The output signal of AND gate 88 is combined with the exhaust valve control signal of the co-controlled system in an OR gate 92 for controlling the exhaust valve EV of the co-controlled system. Special advantages of the circuit arrangement shown in FIG. 4 are the small number of output lines of the principal control circuits and the low component expense for the external logic circuitry. The manner of functioning of the circuit shown in FIG. 4 is as follows. If the signal $T_\nu$ marking the prolongation of the fast application time appears on line 76, the co-control of the supply valve of the co-controlled system is interrupted via AND gate 86, so that in the co-controlled system the supply valve SV and the exhaust valve EV remain deenergized until loss of the time signal $T_\nu$. After this, the system that is not controlled can again be co-controlled by the control signals of the controlled system that are present on line 82 (pulse phase). If a −b control signal appears on line 76, the co-controlled system is bled via AND gate 88 by the exhaust valve control signals on line 84 of the controlled system.

The processes explained above and the circuits that have been mentioned can act over all control cycles. However, the system can also be constructed in such a way that after institution of the control of both wheels, the system can be switched to select-low, with the −b/λ control signal connection in accordance with the circuit shown in FIG. 2. It is also possible to design the process and the circuits in such a way that during the control of both wheels, i.e., when signals indicating skid or slip tendency appear in both automatic control systems, the system can be switched to individual control. A simplified variation can consist in providing only prolongation of the fast application phase, but otherwise synchronously co-controlling the noncontrolling system. To do this, the dash line 100 in FIG. 2 would be connected, and line 34 would be removed.

We claim:

1. A method of controlling braking pressure in an anti-skid brake system for motor vehicles, comprising the steps of,
   (a) separately sensing rapid deceleration, acceleration, and skid conditions of each wheel at opposite ends of an axle of said vehicle,
   (b) producing a deceleration control signal for a braked wheel when its deceleration exceeds a predetermined rate,
   (c) producing a skid control signal for a braked wheel when a skid condition of that wheel is detected,
   (d) reducing the braking pressure applied to both wheels on said axle when a deceleration control signal or a skid control signal is produced for either wheel during an initial brake application,
   (e) producing an acceleration control signal for a wheel when its acceleration exceeds a predetermined rate,
   (f) periodically reapplying braking pressure to wheels at both ends of said axle under fast application conditions for a predetermined time period established when a deceleration control is previously produced,
   (g) halting further increase of braking pressure on the rapidly decelerating wheel corresponding to the produced deceleration control signal and holding existing braking pressure,
   (h) continuing to increase the braking pressure on the other wheel of said axle at said first application rate for a second predetermined time period, (i) applying a second pulse of increasing braking pressure to each wheel subsequent to said second time period, (j) exhausting the braking pressure on both wheels following said second pulse when another deceleration control signal is produced, (k) continuing to exhaust the braking pressure on the controlled wheel until the production of a slip control signal ceases, and (l) repeating the timed application and release cycles of the braking pressure until desired vehicle velocity is obtained.

2. Anti-skid braking apparatus for a vehicle having separate brake control means for each wheel comprising, for the pair of wheels at opposite ends of each axle, the combination of, (a) speed sensing means for each wheel responsive to dynamic movement of that wheel during braking for producing control signals indicating the possibility of skid conditions of the associated wheel resulting from low friction characteristics, (b) a logic circuit network coupled for applying the control signals from the sensing means for one wheel to control the associated brake control means and co-control the brake control means for the other wheel, (c) each brake control means responsive to a deceleration control signal from the associated sensing means for reducing the braking pressure applied to that wheel, and (d) timing means responsive to a deceleration control signal from the sensing means of an associated one wheel with lower friction value for producing a sequence of preselected timing signals and coupled to said logic network for actuating a first period of fast application of braking pressure to both wheels during a first timing signal and for overriding the co-control condition during a second timing signal to extend the fast application of braking pressure to said other wheel to vary the level of applied braking between the wheels.

3. Anti-skid braking apparatus as defined in claim 2 in which,
said logic circuit network is responsive to a deceleration control signal from a sensing means for selecting the associated low friction wheel as the controlled wheel and the other wheel as the co-controlled wheel.

4. Anti-skid braking apparatus as defined in claim 3 in which,
said logic circuit network is responsive to a deceleration control signal for initially exhausting the braking pressure on both wheels and subsequently holding the remaining pressure on the co-controlled wheel at an intermediate level when a predetermined condition in said deceleration control signal is detected.

* * * * *

UNITED STATES PATENT AND TRADEMARK OFFICE
CERTIFICATE OF CORRECTION

PATENT NO. : 4,320,459

DATED : March 16, 1982

INVENTOR(S) : Klaus Lindemann, Konrad Rode, Erwin Petersen

It is certified that error appears in the above-identified patent and that said Letters Patent are hereby corrected as shown below:

Column 6, line 67, delete "first" and insert --fast--

Signed and Sealed this

Fourteenth Day of December 1982

[SEAL]

Attest:

GERALD J. MOSSINGHOFF

Attesting Officer          Commissioner of Patents and Trademarks